April 18, 1933.   J. G. KIMMEL   1,904,001
METHOD AND APPARATUS FOR CONTROLLING THE TEMPERATURE OF THE SOIL
Filed April 11, 1931
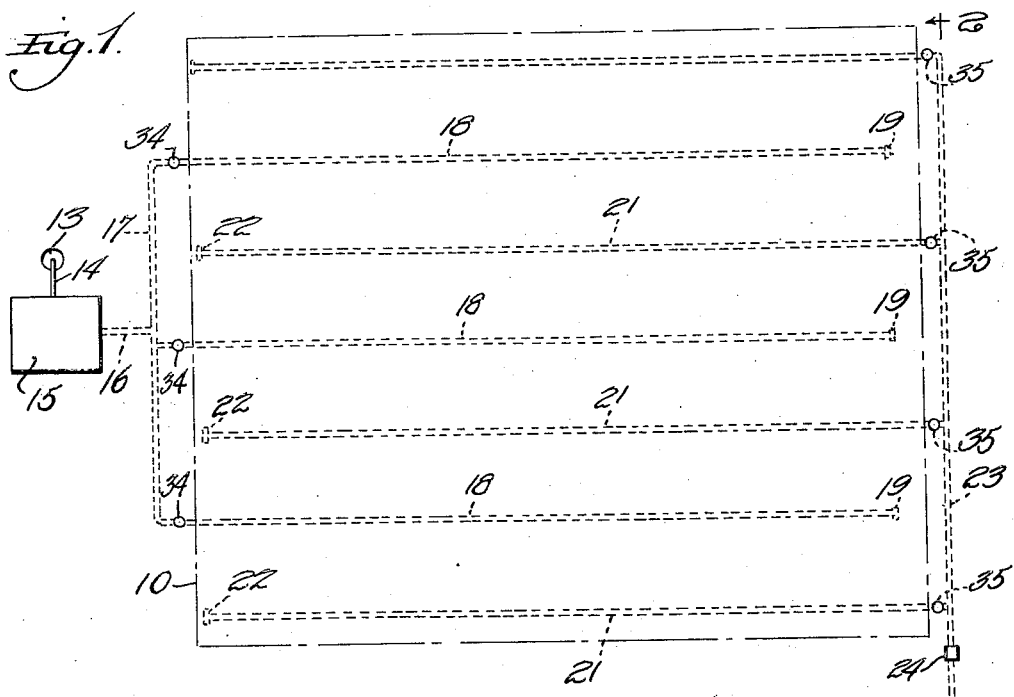
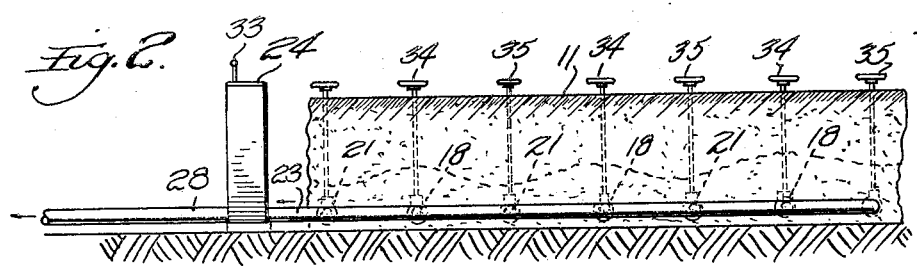
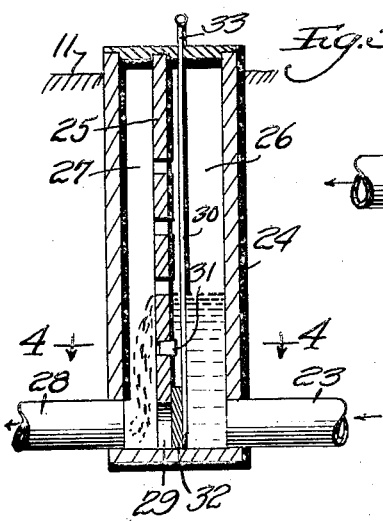
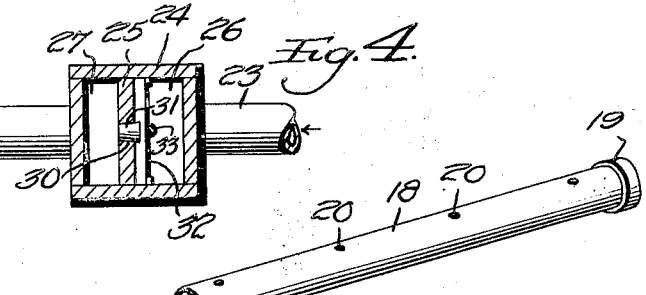
Inventor
J. G. KIMMEL
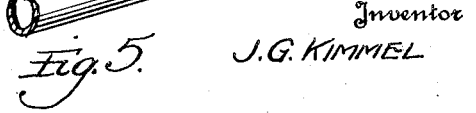
By C. L. Parker Jr.
Attorney Patented Apr. 18, 1933

1,904,001

UNITED STATES PATENT OFFICE

JOSEPH G. KIMMEL, OF SARASOTA, FLORIDA

METHOD AND APPARATUS FOR CONTROLLING THE TEMPERATURE OF THE SOIL

Application filed April 11, 1931. Serial No. 529,468.

This invention relates to a method and apparatus for controlling the temperature of the soil.

The irrigation of land is, of course, old and well known, having been practiced for many years in the cultivation of vegetation where insufficient rainfall is available. Attempts have been made to employ irrigation water also for the purpose of controlling the temperature of the soil by heating the water prior to its application to the soil. For example, attempts to control soil temperature have been made by laying perforated pipes beneath the surface of the ground and supplying warm water to the pipes, the water being permitted to flow into the soil through the perforations in the pipes to heat the soil. Similar attempts have been made by supplying warm water to irrigating ditches.

Attempts of the character referred to for controlling soil temperatures have proved to be largely impracticable. It will be apparent that the soil is capable of absorbing limited amounts of water, and any excess supply of water results in injury to plants through flooding.

Accordingly with the methods outlined, warm water can be supplied to the soil only in amounts within reasonable limits to prevent flooding, and when the flood stage is approached the supply of water must be cut off with the result that no further warmth can be imparted to the soil for a considerable length of time, and the heat units previously conducted to the soil are soon lost through conduction and radiation. Accordingly it will be apparent that while the suggested methods are operative for initially raising the temperature of the soil, they are wholly inoperative for continuously controlling the temperature over long periods of time to afford protection from the frost, and to hold temperatures favorable to bacterial action.

The present invention is intended to overcome the disadvantages of the prior methods referred to and is particularly applicable to those farming sections having a porous top soil and a substantially impervious subsoil. For example, much of the land in the State of Florida consists of a layer of top soil approximately twenty-four inches in depth and of a pervious nature, the sub-soil therebeneath being substantially impervious.

An important object of the present invention is to provide a method and apparatus for controlling soil temperatures wherein the application of heat to the soil is rendered continuously possible by drawing off the heating medium after it has given up its heat to the soil, and thus eliminating the disadvantage of flooding the soil by one of the methods previously outlined.

A further object is to provide a method and apparatus by means of which a continuous circulation of the heating medium is accomplished to permit the temperature of the soil to be continuously controlled.

A further object is to provide an apparatus adapted for acomplishing the desired results by supplying a heating medium to the soil and then withdrawing the medium after it has given up its heat to the soil to permit the continued introduction of the heating medium to maintain the desired soil temperature.

Other objects and advantages of the invention will become apparent during the course of the following description.

I have found that it is wholly practicable to supply a heating medium to the soil to elevate the temperature thereof, and to withdraw the heating medium after it has given up its heat to the soil and thereby permit the continuous introduction of additional heating medium to maintain the soil temperature at the desired point favorable to bacterial action, and to protect the plants from the frost. Any desired heating fluid may be employed, but in practice it has been found advisable and practicable to employ heated water for this purpose.

The heating fluid may be supplied to the soil in any desired manner. For example, where a substantially impervious earth lies beneath the top soil, the water or other heating medium may be supplied to the earth through irrigating ditches, from which ditches the water will be absorbed laterally into the soil because of the impervious nature of the underlying soil. It is preferred, however, that the heating medium be supplied through perforated pipes laid beneath the surface of the earth whereby the water may flow into the soil through the perforations in the pipes. For the reasons previously stated, water can be thus supplied to the earth only in limited quantities without causing injury to the plant by flooding, and to overcome this difficulty, I provide take-off pipes for the water to prevent an excess accumulation thereof in the top soil. The take-off pipes are also perforated to permit the accumulated water to flow thereinto, and such pipes are spaced from and so placed with respect to the supply pipes as to receive the water only after it has flowed a sufficient distance through the soil to permit it to impart heat units thereto so as to maintain the soil temperature.

For example, in a given tract of land, the supply pipes may be laid in spaced parallel relation and supplied with water from one end by a suitable header. Similar parallel take-off pipes may be interposed between the parallel supply pipes and spaced the proper distance therefrom. As water is supplied to the soil therefore it will be absorbed into the pervious soil to raise the temperature thereof, and as the water accumulates, it flows into the perforations of the take-off pipes to be thus drained off to permit the continuous supply of additional water.

By suitable means to be described, the water may be maintained in the top soil to any desired depth, and the water drained from the land may be discarded or may be returned to the source to be reheated and thus provide a continuous circulating system. By the method outlined, a proper soil temperature may be maintained continuously without danger of injury to the plant by flooding, and thus proper temperatures may be maintained which are favorable to bacterial action and which will adequately protect the plant against injury by frost. In actual practice it has been found that by the use of the present invention, tender vegetables such as beans and cucumbers have been protected against frost over substantial periods of time while much hardier plants such as tomatoes were frozen to the ground at nearby points where the present method was not used.

The temperature of the water supplied to the soil will of course depend upon temperature conditions. For example, in the State of Florida, flowing wells are available for supplying water at a temperature of approximately 80° F., and water at such temperature has been found practicable for use during moderate weather in the climate present in that State. During cold periods, the water may be heated to slightly or substantially higher temperatures depending upon the conditions present. At times when it is necessary to only slightly heat the water, it has been found practicable to supply the water to trays exposed to the direct rays of the sun and sheltered from the wind, and under such conditions, the expense incident to the heating of the water may be avoided.

In the drawing I have shown one form of aparatus particularly adapted for practicing the method. In this showing, Figure 1 is a plan view of a section of land showing the apparatus installed.

Figure 2 is a section on line 2—2 of Figure 1,

Figure 3 is a detail vertical sectional view of the stop box,

Figure 4 is a horizontal section on line 4—4 of Figure 3, and,

Figure 5 is a fragmentary perspective view of a portion of one of the feed pipes.

Referring to Figure 1, the numeral 10 designates a section of land of any size, and of the character previously described in connection with which the apparatus is adapted to be used, the land including a layer of pervious top soil 11 with its underlying substantially impervious sub-soil 12.

In Figure 1 the numeral 13 represents a well connected by a pipe 14 to a suitable heating plant 15 by means of which the water is heated before being conducted to the soil. An outlet pipe 16 connects the heating plant to a header 17 to which are connected a plurality of preferably parallel supply pipes 18. The opposite ends of the pipes 18 are capped or otherwise closed as at 19. As shown in Figure 5, the supply pipes 18 are suitably perforated as at 20 to permit the water or other heating medium to flow from the pipes into the soil.

Take-off pipes 21, similar to the pipes 18, are arranged as shown in Figure 1, these pipes being preferably parallel and each arranged substantially centrally of the space between the adjacent pair of pipes 18. The take-off pipes are identical with the supply pipes 18 in that they are also provided with perforations as will be apparent.

One end of each of the pipes 21 is capped as at 22, while the other ends of these pipes are connected to an outlet header 23. The header 23 has one end leading to a stop box 24 shown in detail in Figures 3 and 4. As shown, the stop box is vertically arranged and rectangular in cross section and is divided by a vertical wall 25 to form compartments 26 and 27. The pipe 23 obviously leads into the compartment 26, while water from the compartment 27 flows therefrom through a take-off pipe 28. The water in pipe 28 may flow therefrom by gravity, or it may be connected to a suitable pump, as will be apparent.

The wall 25 is provided at its lower end with a relatively large opening 29, and a series of smaller openings 30 extend through the wall at spaced points above the opening 29, as clearly shown in Figure 3. Plugs 31 are provided for the openings 30 for a purpose to be described. A vertically slidable valve 32 is adapted to close the opening 29 and is controlled by a suitable vertically extending handle 33.

For the purpose of securing a variable supply of water to different parts of the land, the pipes 18 may be provided with control valves 34 adjacent the header 17. Similarly the pipes 21 may be provided with control valves 35 to retard the discharge of water through the pipes 21 as may be desired.

The operation of the apparatus is as follows:

Water flows from the well to the heating apparatus 15 and the temperature of the water is raised therein to the desired point. In mild weather, it sometimes will be unnecessary to heat the water, in which case it is permitted to flow at well temperature directly into the pipe 16.

From the pipe 16 the water is supplied through the header 17 to the pipes 18, and flows outwardly through the openings 20 therein to be absorbed by the layer of top soil 11. Due to the impervious nature of the underlying soil 12, the water will spread laterally through the top soil and will heat the latter by conduction. After the water has given up its heat to the top soil to raise the temperature thereof, it flows into the take-off pipe 21 through the perforations therein, and thence flows into the header 23 to the stop box 24.

If the valve handle 33 is raised to lift the valve 32, the water will flow directly between the header 23 and pipe 28, and under such conditions the water will be free to flow directly from the pipes 18 to the pipes 21 without accumulating to a substantial depth in the top soil. Ordinarily it is desired to maintain the water in the top soil at a substantial depth in order to secure proper heat transferrance, before permitting the water to be drained out through the pipes 21. Under such conditions, the valve 32 may be closed, and water will remain in the compartment 26 until it reaches the level of the lowermost opening 30, at which time it will flow into the compartment 27 to be discharged through the pipe 28.

Accordingly a head of water will be maintained in the compartment 26, and water will be prevented from flowing into the perforations of the outlet pipes 21 until the water accumulates to a depth sufficient to overcome the head of liquid in the compartment 26. At such time the further accumulation of water in the soil will be prevented, and excess water will be drained out to maintain the water at a substantially constant depth.

It will be apparent that if it is desired to maintain the water at a greater depth, a plug may be inserted in the lowermost opening 30, and thus the accumulation of a higher head of liquid will be caused in the compartment 26, and thus water will not be drained from the top soil until it reaches a corresponding depth. Any number of the openings 30 may be closed in a similar manner to cause the desired accumulation of water in the top soil.

It will be apparent that the rate of supply of water to various parts of the land through the pipes 18 may be controlled by the valves 34. In a similar manner, the discharge of water from any part of the land may be controlled by proper operation of the valves 35.

From the foregoing it will be apparent that the apparatus illustrated is particularly adapted for use in practicing the method. Water at controlled temperatures may be supplied to the land in accordance with varying conditions so that the soil may be maintained at the desired temperature favorable to bacterial action, which temperatures will fully protect the plant against injury by frost. The depth of the water maintained in the soil obviously can be readily controlled by proper operation of the stop box, and by operating the valves 34 and 35.

Thus it will be apparent that a continuous circulation of heating liquid is provided and damage to the plants by flooding is prevented. In other words, water is supplied continuously through the pipes 18, and after the desired accumulation of water in the soil has been obtained, the water will be drained at an equal rate from the soil through the pipes 21 to be discarded or used again. For example, the discharge pipe 28 readily may be connected to the heating apparatus to recirculate the discharged water if desired.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The method of elevating and controlling the temperature of the soil to render it favorable to plant growth which comprises continuously supplying a liquid heating medium to the soil beneath the surface thereof, and continuously withdrawing the medium from the soil beneath the surface thereof at a point horizontally spaced from its point of introduction into the soil.

2. The method of elevating and controlling the temperature of the soil to render it favorable to plant growth which comprises continuously supplying a liquid heating medium from a common point to a plurality of points beneath the surface of the soil, and continuously withdrawing the medium from the soil beneath the surface thereof at a plurality of points horizontally spaced from the points of introduction of the liquid.

3. The method of elevating and controlling the temperature of the soil to render it favorable to plant growth which comprises heating a liquid medium, conducting the medium to and discharging it at a plurality of spaced points beneath the surface of the soil, and continuously withdrawing the medium from the soil beneath the surface thereof at a plurality of points horizontally spaced from the points of introduction of the liquid into the soil.

4. The method of elevating and controlling the temperature of the soil to render it favorable to plant growth which comprises continuously supplying a liquid medium at an elevated temperature to the soil beneath the surface thereof, maintaining the level of the liquid in the soil at a given point beneath the surface of the latter, and continuously drawing off excess accumulations of the liquid from the soil.

5. The method of elevating and controlling the temperature of the soil to render it favorable to plant growth which comprises continuously supplying a heated liquid medium to the soil at a point substantially beneath the surface thereof, maintaining the level of the liquid at a point between its place of introduction into the soil and the surface of the soil, and continuously withdrawing excess accumulations of the liquid from the soil.

6. The method of elevating and controlling the temperature of the soil to render it favorable to plant growth which comprises continuously supplying a heated liquid medium from a common source to a plurality of discharge points a substantial distance beneath the surface of the soil, maintaining the level of the liquid at a point between the surface of the soil and the level of the points of introduction of the liquid into the soil, and continuously withdrawing excess accumulations of the liquid from the soil.

7. The method of elevating and controlling the temperature of the soil to render it favorable to plant growth which comprises heating a liquid medium, conducting the medium to and discharging it at a point beneath the surface of the soil, maintaining the level of the liquid at a given point beneath the surface of the soil, and continuously drawing off excess accumulations of the liquid from the soil.

8. Apparatus of the character described comprising a substantially horizontal conduit for conducting a liquid heating medium to a point beneath the surface of and discharging it to the soil, means for supplying a liquid heating medium to said conduit, and means wholly separate from said conduit for continuously withdrawing the medium from the soil at a point horizontally spaced from its point of introduction thereinto.

9. Apparatus of the character described comprising means for conducting a liquid medium to a plurality of points beneath the surface of the soil and discharging it at such points, means for supplying a liquid heating medium to said first named means, and a take-off conduit wholly separate from said first named means and horizontally spaced therefrom for withdrawing the liquid medium from the soil.

10. Apparatus of the character described comprising a substantially horizontal conduit arranged beneath the surface of the soil and having a plurality of discharge openings, means for supplying a liquid heating medium to said conduit, and a take-off conduit wholly separate from said first named conduit and horizontally spaced therefrom arranged beneath the surface of the soil and having a plurality of openings adapted to permit the continuous flow of the liquid medium in the soil into said take-off conduit.

11. Apparatus of the character described comprising a substantially horizontal conduit arranged beneath the surface of the soil and having a plurality of discharge openings, means for supplying a liquid heating medium to said conduit to be discharged into the soil through said openings, and a take-off conduit wholly separate from said first named conduit spaced from and parallel to said first named conduit and provided with a plurality of spaced openings adapted to permit the continuous flow of the liquid medium in the soil into said take-off conduit.

12. Apparatus of the character described comprising a conduit for conducting a liquid heating medium to a point beneath the surface of and discharging it to the soil, means for maintaining the level of the medium at a point between the surface of the soil and the point of introduction of the medium into the soil, and a take-off conduit adapted to continuously withdraw liquid from the soil after the level of the liquid reaches said point.

13. Apparatus of the character described comprising a conduit arranged beneath the surface of the soil and having a plurality of discharge openings, means for supplying a liquid heating medium to said conduit to be discharged into the soil through said openings, means for maintaining the level of the medium at a point between said conduit and the surface of the soil, and a take-off conduit spaced from and parallel to said first named conduit and provided with a plurality of spaced openings adapted to permit the continuous flow of the liquid medium from the soil into said take-off conduit.

In testimony whereof I affix my signature.

JOSEPH G. KIMMEL.